United States Patent
Gao et al.

(10) Patent No.: US 8,913,540 B2
(45) Date of Patent: Dec. 16, 2014

(54) TRIPLE-PLAY PROTOCOL—A MEDIA ACCESS CONTROL LAYER PROTOCOL FOR TRANSMISSIONS IN NETWORK-CODED THREE NODE BIDIRECTIONAL COOPERATION

(75) Inventors: Wen Gao, West Windsor, NJ (US); Jialing Li, Melville, NY (US)

(73) Assignee: Thomson Licensing, Issy les Moulineaux (FR)

( * ) Notice: Subject to any disclaimer, the term of this patent is extended or adjusted under 35 U.S.C. 154(b) by 77 days.

(21) Appl. No.: 13/702,381

(22) PCT Filed: Jul. 13, 2010

(86) PCT No.: PCT/US2010/041817
§ 371 (c)(1),
(2), (4) Date: Dec. 6, 2012

(87) PCT Pub. No.: WO2012/008950
PCT Pub. Date: Jan. 19, 2012

(65) Prior Publication Data
US 2013/0077555 A1    Mar. 28, 2013

(51) Int. Cl.
*H04W 72/00*    (2009.01)
*H04L 1/18*    (2006.01)
*H04W 72/04*    (2009.01)
*H04L 1/00*    (2006.01)

(52) U.S. Cl.
CPC ........... *H04W 72/005* (2013.01); *H04L 1/1887* (2013.01); *H04W 72/044* (2013.01); *H04L 2001/0097* (2013.01)
USPC ........... 370/312; 370/338; 370/447; 370/450

(58) Field of Classification Search
CPC .. H04B 7/022; H04B 7/1555; H04B 7/15521; H04B 7/15; H04L 1/1887; H04L 2001/0097; H04W 72/044; H04W 72/005; H04W 72/00; H04W 72/04
USPC ................. 370/312, 315, 338, 445, 447, 450; 455/11.1
See application file for complete search history.

(56) References Cited

U.S. PATENT DOCUMENTS

| | | | | |
|---|---|---|---|---|
| 2007/0149117 | A1* | 6/2007 | Hwang et al. | 455/11.1 |
| 2009/0252143 | A1* | 10/2009 | Sridhara et al. | 370/345 |
| 2011/0051647 | A1* | 3/2011 | Sampath et al. | 370/312 |
| 2011/0064065 | A1* | 3/2011 | Nakajima et al. | 370/338 |
| 2011/0286402 | A1* | 11/2011 | Gong | 370/329 |

OTHER PUBLICATIONS

Potevio et al., "An Improved Uplink Access Way Through Coordinate Communicate Based on Relay Overhearing in LTE-Advanced System", 3GPP Draft, R1-09001, 3rd Generation Paternship Project (3GPP), Mobile Competence Centre, Jan. 7, 2009.
Bell et al., "Network Coded Relay and It's Chase Combining", Alcatel-Lucent, 3GPP Draft, 3rd Generation Parntership Project (3GPP), Mobile Competence Centre, Cdex France, Apr. 28, 2009.
Potevio, "On the Application of Type II and Type I Relay", 3GPP Draft, 3rd Generation Partnership Project (3GPP), Mobile Competence Centre, Cedex, France, Apr. 28, 2009.

* cited by examiner

*Primary Examiner* — Andrew Chriss
*Assistant Examiner* — Rasha Fayed
(74) *Attorney, Agent, or Firm* — Robert D. Shedd; Jeffrey M. Navon; Catherine A. Cooper

(57) ABSTRACT

A method and apparatus are described including transmitting a request-to-send signal, determining if a clear-to-send signal and a reverse direction transmission request signal have been received, transmitting first data, a first block acknowledgement request signal and a reverse direction grant signal responsive to the first determination, determining if a first block acknowledgement signal, second data and a second block acknowledgement request signal have been received, transmitting a second block acknowledgement signal responsive to the second determination, determining if a third block acknowledgement signal has been received and transmitting a fourth block acknowledgement signal responsive to the third determination. Further described are a method and apparatus including listening to channels, estimating channel conditions responsive to the listening, determining if a signal has been received, determining if channel conditions are adequate to act as a relay node multicasting a relay node clear to send signal responsive to the first and second determinations and multicasting a block acknowledgement signal and data responsive to the first and second determinations.

6 Claims, 10 Drawing Sheets

TRIPLE-PLAY PROTOCOL—A MEDIA ACCESS CONTROL LAYER PROTOCOL FOR TRANSMISSIONS IN NETWORK-CODED THREE NODE BIDIRECTIONAL COOPERATION

This application claims the benefit, under 35 U.S.C. §365 of International Application PCT/US10/041,817, filed 13 Jul. 2010, which was published in accordance with PCT Article 21(2) on 19 Jan. 2012 in English.

FIELD OF THE INVENTION

The present invention is directed to a three node cooperation scheme to assist in bidirectional transmissions (communications) of the draft IEEE 802.11n standard.

BACKGROUND OF THE INVENTION

In multicast and broadcast applications, data are transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

Consider multicast (downlink) and multi-access (uplink) channels with one access point (AP) and several nodes. In the IEEE 802.11n draft standard, a reverse direction (RD) protocol is introduced for fast scheduling of bidirectional traffic flows within a transmission opportunity (TXOP). The reverse direction protocol permits (allows) the node, which has obtained the TXOP to grant reverse directional transmissions to another node while it is still in control of the TXOP. If the channel conditions between the nodes are inadequate (poor) then transmissions between the two nodes suffers. That suffering may be reduced data rate and/or throughput.

In the IEEE 802.11n draft standard, reverse direction (RD) protocol has been proposed as in FIG. 1. The reverse direction protocol of the IEEE 802.11n draft standard only schedules bidirectional transmission between two nodes. There is no existing scheduling protocol for three-node bidirectional transmissions in IEEE 802.11 WLAN standards.

It would be advantageous to have a third node act as a relay node for the two nodes. The use of such a third (relay) node, however, complicates the communications (transmissions) between the two nodes.

SUMMARY OF THE INVENTION

As used herein a node includes (but is not limited to) a station (STA), a mobile device, a mobile terminal, a dual mode smart phone, a computer, a laptop computer or any other equivalent device capable of operating under the IEEE 802.11n draft standard.

Consider multicast (downlink) and multi-access (uplink) channels with one access point (AP) and several nodes. In the IEEE 802.11n draft standard, a reverse direction (RD) protocol is introduced for fast scheduling of bidirectional traffic flows within a transmission opportunity (TXOP). The reverse direction protocol permits (allows) the node, which has obtained the TXOP to grant reverse directional transmissions to another node while it is still in control of the TXOP. When the transmission between these two nodes involves cooperation through a third node, a half-duplex relay node (RN), the situation becomes more complicated, and wireless network coding can be utilized to further increase system throughput. The present invention describes a triple-play protocol at the MAC-layer for scheduling transmissions with network-coded three-node bidirectional cooperation.

A method and apparatus are described including transmitting a request-to-send signal, determining if a clear-to-send signal and a reverse direction transmission request signal have been received, transmitting first data, a first block acknowledgement request signal and a reverse direction grant signal responsive to the first determination, determining if a first block acknowledgement signal, second data and a second block acknowledgement request signal have been received, transmitting a second block acknowledgement signal responsive to the second determination, determining if a third block acknowledgement signal has been received and transmitting a fourth block acknowledgement signal responsive to the third determination. Also described are a method and apparatus including determining if a request to send signal has been received, transmitting a clear to send signal, a reverse direction transmission request signal responsive to the first determination, determining if first data, a first block acknowledgement request signal and a reverse direction transmission grant signal have been received, transmitting first block acknowledgement signal, second data and a second block acknowledgement request responsive to the second determination, determining if a second block acknowledgement signal and third data have been received and transmitting a third block acknowledgement signal responsive to the third determination. Further described are a method and apparatus including listening to channels, estimating channel conditions responsive to the listening, determining if a signal has been received, determining if channel conditions are adequate to act as a relay node multicasting a relay node clear to send signal responsive to the first and second determinations and multicasting a block acknowledgement signal and data responsive to the first and second determinations.

Such a MAC-layer triple-play protocol may be essential to the future IEEE 802.11 Very High Throughput (VHT) standard. The advantage of the triple-play protocol of the present invention is that it is designed based on the proposed reverse direction (RD) protocol in the IEEE 802.11n draft standard so that the change to the future standard is minimum and easily backward compatible.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
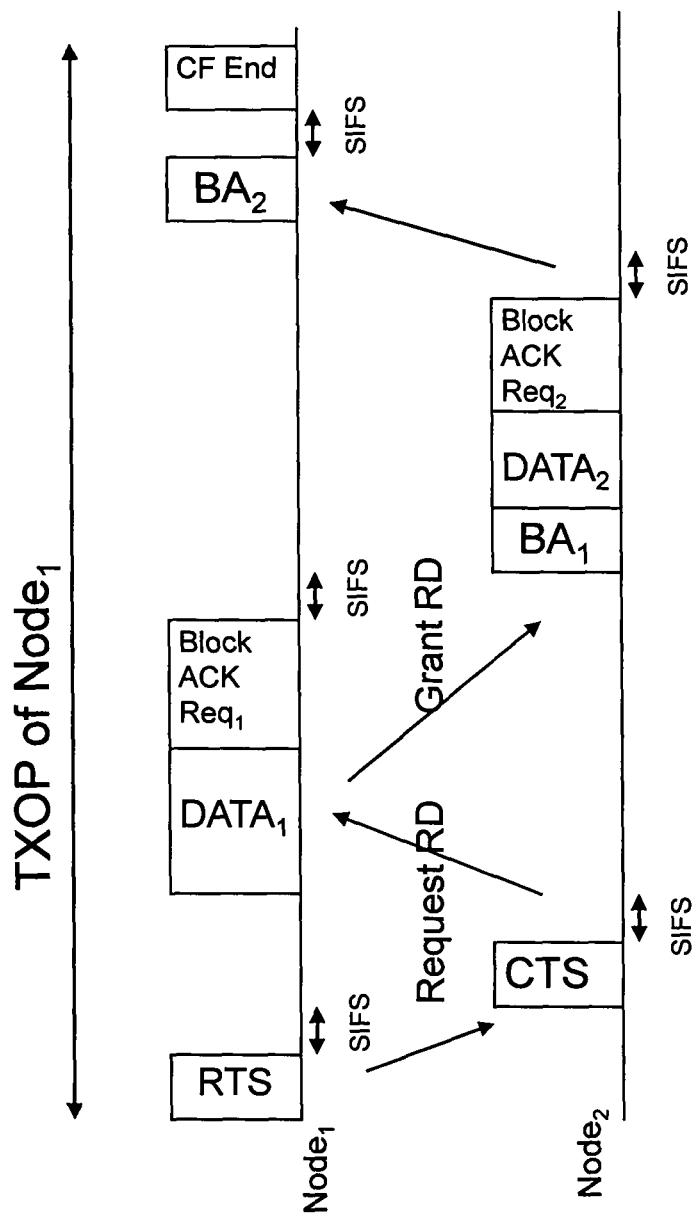
FIG. 1 is a diagram illustrating the operation of two nods operating in accordance with the IEEE 802.11n standard requesting reverse direction transmissions.

In the three-node bidirectional cooperation protocol of the present invention, two nodes, $Node_1$ and $Node_2$ are each both source and destination nodes in the sense that there are bidirectional traffic flows between them, and the third node RN is a relay node, assisting in the bidirectional transmission. It should be noted that any node can be a source node and any node can be a destination node and any node can be a RN. In fact, a node can operate as a source node, a destination node and a RN concurrently. Without loss of generality, assume that $Node_1$ obtains a TXOP, and $Node_1$ initiates bidirectional communications (traffic flow, transmissions) with $Node_2$. However, due to poor channel conditions on the direct link between the two nodes, a cooperative relay node (RN) is employed to forward data to both nodes to assist in the decoding process at both nodes. Decoding occurs at a node after receipt of data transmissions (communications). Decoding is used to reverse encoding, which was used to increase the reliability of the data. For example, Reed-Solomon and Viterbi encoding or even simple parity checking are used increase the reliability of transmitted data. Data may include, but is not limited to, audio, video, multimedia, content or any other form of data. Data is used formatted into packets and/or frames but these terms are used interchangeably herein to indicate any formatting scheme.

Wireless network coding is a trade-off between increasing reliability of data transmissions (communications) through cooperation and maintaining a given data rate of unidirectional transmissions through direct links. The relay node (RN) receives data from both $Node_1$ and $Node_2$ (in different time slots, or simultaneously) mixes (combines) the two set of data to produce a new set of data, and broadcasts (multicasts) the new mixed data to both nodes. Each of the nodes (source and destination) receives both the transmission of the desired data from the other node (source and destination), and the transmission from the RN. Each node can then jointly decode the data it desires based on the knowledge of the data it transmitted (sent out).

The mixed data at the RN is a function of the two sets of received data. The method by which the RN mixes the data is network-coding based. Several examples of network-coding known in the art are given below as well as a possible method of mixing data. It should be understood that the examples below are not a comprehensive list.

(1) The data can be decode-and-forward based network coded, i.e., binary addition of two sequence of decoded information bits.

(2) The data can be soft decode-and-forward based network coded, i.e., combination of the log-likelihood ratios (LLR) of the soft decoded bits of the two data.

(3) The data can be amplify-and-forward or compress-and-forward based network coded, i.e., linear combination of the two weighted received signals. The data can be further divided into digital network coding and analog network coding, depending on whether the relay node (RN) receives individual signals separately, or a mixed signal from both nodes.

(4) The data can be physical-layer network coded, i.e., operation in physical-layer domain, but is equivalent to binary addition in binary domain.

(5) The data can be denoise-and-forward based network coded, i.e., using another designed codebook to represent possible transmitted data.

The Triple-play protocol of the present invention can be coupled with single-antenna and/or multiple-antenna techniques. Spatial multiplexing, space-time block codes, transmit and/or receive beamforming can be applied to all transmissions.

The Triple-play protocol has two embodiments: the first embodiment is without initial handshaking while the second embodiment has initial handshaking between nodes ($Node_1$, $Node_2$ and the RN). The Triple-play protocol of the present invention attempts to schedule the transmissions from the three nodes within the TXOP of $Node_1$.

Frame aggregation and multiple traffic ID block acknowledgement (MTBA), which are described in the IEEE 802.11n draft standard, are assumed in the Triple-play protocol of the present invention. Therefore, the system of the present invention can further increase the data rate if RN only processes the sub-frames the two nodes (source and destination) do not decode the data correctly.

Figure 2:
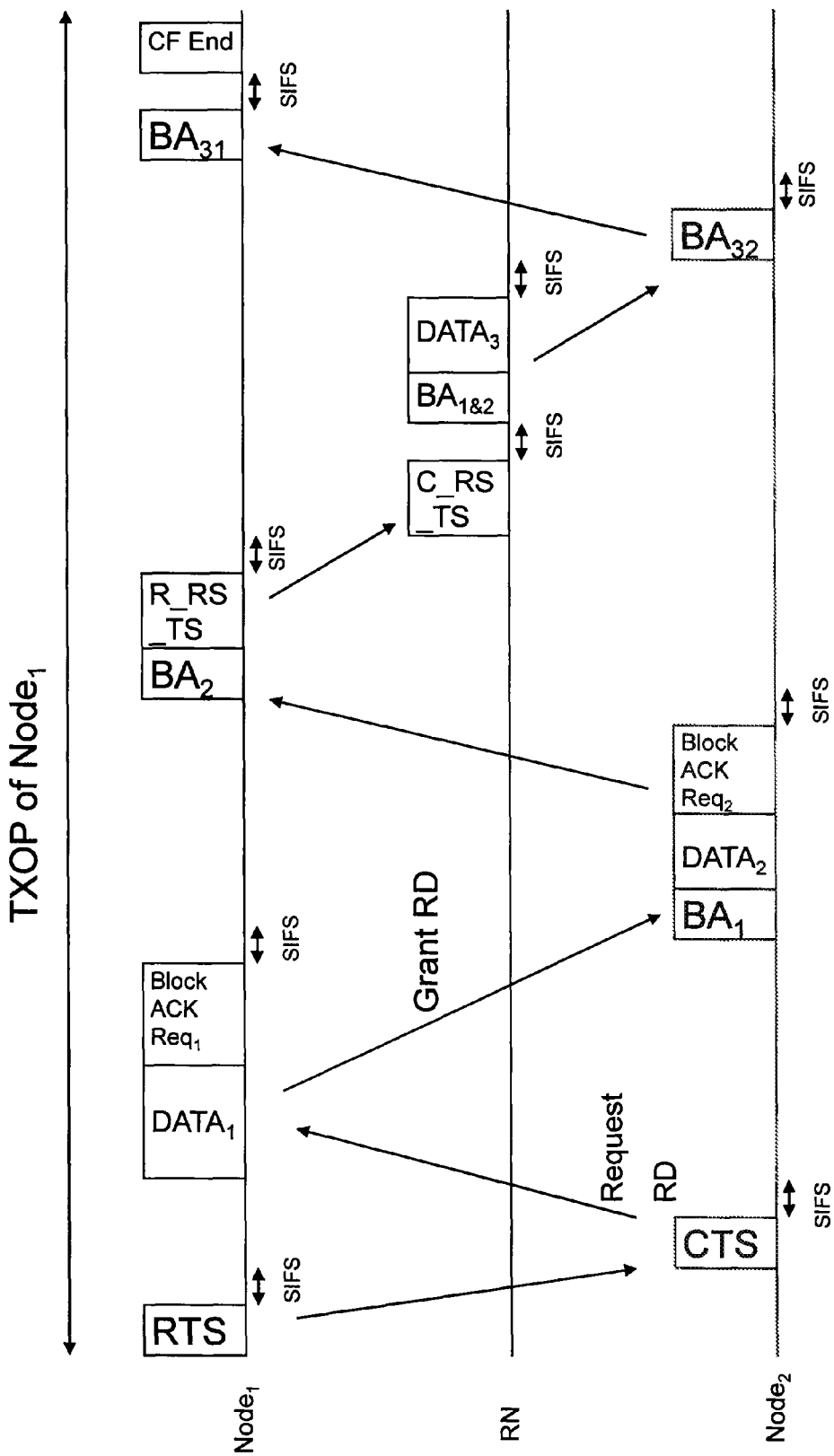
FIG. 2 is a diagram illustrating the first embodiment of the Triple-play protocol of the present invention without initial handshaking with the RN.

The first embodiment is the Triple-play protocol of the present invention without initial handshaking with the RN. In this embodiment, any node, which has good reception of the two transmissions between $Node_1$ and $Node_2$, can compete to serve as a relay node (RN). The first embodiment is illustrated in FIG. 2. The Triple-play protocol of the present invention without initial handshaking operates as follows:

(1) When $Node_2$ acknowledges (to $Node_1$) the request-to-send (RTS) signal (message) transmitted (sent by) $Node_1$ by sending a clear-to-send (CTS) message (signal), $Node_2$ also requests reverse direction transmission, which is a bidirectional communication. $Node_1$ then transmits $DATA_1$ and a Block Acknowledgement (ACK) request and grants RD transmission to $Node_2$. In another embodiment of the invention, $Node_1$ can grants RD transmission to $Node_2$ without an explicit request from $Node_2$.

(2) $Node_2$ returns a Block ACK to $Node_1$ ($BA_1$) containing information regarding any incorrectly received sub-frames in $DATA_1$. $Node_2$ also sends its $DATA_2$ followed by its Block ACK Request (3) $Node_1$ sends a Block ACK to $Node_2$ ($BA_2$) containing information regarding any incorrectly received sub-frames in $DATA_2$. If $Node_2$ does not receive all sub-frames in $DATA_1$ correctly and/or $Node_1$ does not receive all sub-frames in $DATA_2$ correctly, $Node_1$ posts a Request_RS_To_Send (R_RS_TS) message (signal) to ask for help from a RN.

(4) If a RN receives both $Node_2$'s missing portions of $DATA_1$ and $Node_1$'s missing portions of $DATA_2$ correctly, and also receives the R_RS_TS message (signal), the RN can transmit (send out) a Clear_RS_To_Send (C_RS_TS) message (signal) to inform $Node_1$ and $Node_2$ that it is serving as a RN. The RN then multicasts (broadcasts) a Block ACK ($BA_{1\&2}$) to report its reception of both the missing portions of $DATA_1$ and $DATA_2$, followed by the combined $DATA_3$ based on any one of a variety of network coding schemes, such as given in the examples above. It is assumed that the RN has received both the missing portions of data as well as $BA_1$ and $BA_2$ in order to determine what data is missing (incorrectly received, lost, corrupted, damaged) so that the RN can mix (combine) the missing portions of data using any network-coding scheme such as the examples given above.

Note that if the RN only receives a portion of $Node_2$'s missing portions of $DATA_1$ and only a portion of $Node_1$'s missing portion of $DATA_2$ correctly, The RN can also combine those portions of data based on the exemplary network coding schemes above and transmit (communicate, send) it as $DATA_3$.

There is a bit-map in $BA_{1\&2}$, which is automatically reduced to containing information regarding only the correctly received missing portions of $DATA_1$ followed by information regarding only the correctly received missing portions of $DATA_2$. The RN does not need to transmit (communicate, send out) a Block ACK Request after its transmission, since both $Node_1$ and $Node_2$ are aware of (know) the bit-map.

(5) $Node_2$ sends out (transmits, communicates) a Block ACK ($BA_{32}$) first, reporting its reception of the missing portions of $DATA_1$, and then $Node_1$ communicates (sends out, transmits) $BA_{31}$ later, reporting its reception of the missing portions of $DATA_2$ only. In an alternative embodiment of the present invention, the order to send a Block ACK is reversed.

(6) After a RN's transmission, if either or both $Node_1$ and $Node_2$ still need retransmission of some sub-frames, and the TXOP has not expired (run out), either of them can transmit (send out, communicate) another R_RS_TS to ask for help again, and the same or another node can serve as a RN, or the other source node (if $Node_1$ still needs missing data and goes first sending out another R_RS_TS message (signal) then $Node_2$ is the other source node) can retransmit.

(7) Since control frames are more important than data frame because they play a vital role in scheduling and signaling, it is recommended that control frames be sent (transmitted, communicated) using a low data rate, while data is sent (transmitted, communicated) using a high data rate so that their reception has diversity at the destination. A low data rate transmission should by its very nature be more reliable.

(8) Note that in the Triple-play protocol of the present invention, a RN is specified independent of $Node_1$, while in reality such a RN may not exist or all RNs may not successfully decode both sets of data, or majority of both sets of data. In such a case, if $Node_1$ waits for a certain period of time but hears no C_RS_TS, i.e., no RN can help, $Node_1$ should retransmit data indicated by $Node_2$ in $BA_2$ that $Node_2$ did not correctly receive.

Figure 3:
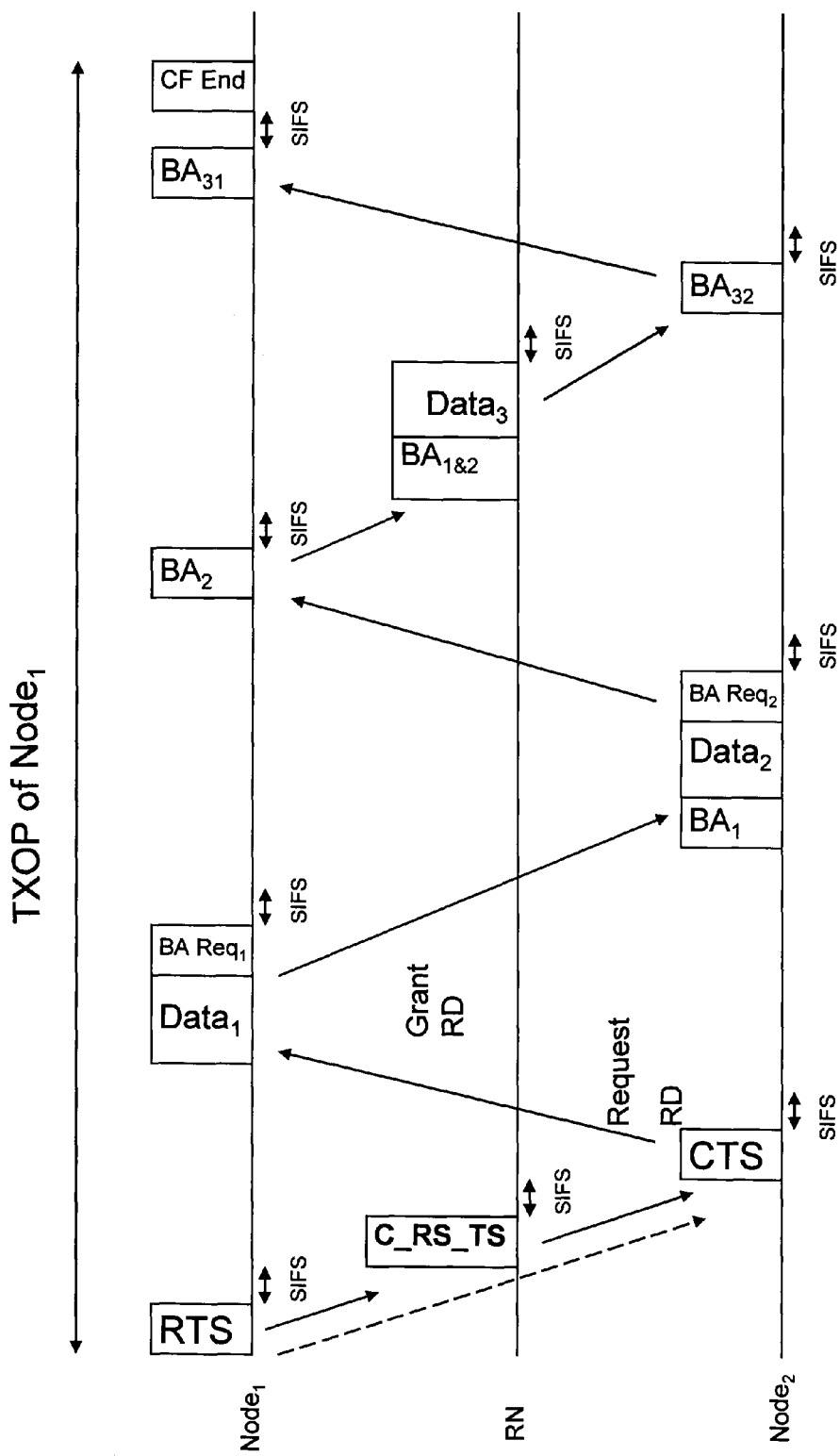
FIG. 3 is a diagram illustrating the second embodiment of the Triple-play protocol of the present invention with initial handshaking with the RN.

The second embodiment is the Triple-play protocol of the present invention with initial handshaking with the RN. The advantages of this embodiment over the first embodiment are: First, since $Node_1$ and $Node_2$ know that a dedicated RN exists, their transmission (communication) can be more aggressive. Second, the RN will be sensitive to transmissions from both nodes (source and destination) and restore and process the data. Third, the other nodes, which may possibly receive signals from both nodes (source and destination), are relaxed since they do not need to always listen to the channel. However, the other nodes who are free (available), including the RN, may still need to somehow listen to the channel and obtain channel information from other nodes so that they can best estimate their benefits to the network if they serve as the RN. Moreover, the competition to be a RN is now not motivated just by the good reception of the data, but more on the willingness, which may result in a node which does not have adequate or the best channel qualities (conditions) beating out other nodes to become the RN. Therefore, a good RN competition mechanism is required based on channel conditions. The second embodiment is illustrated in FIG. 3. Its description is as follows:

(1) If a RN receives $Node_1$'s RTS, it can send out (transmit, communicate) a C_RS_TS (Clear_RS_To_Send) frame to inform other nodes that it is serving as a RN before $Node_2$ sends (transmits, communicates) a CTS. Both $Node_1$ and $Node_2$ should be able to receive the C_RS_TS. $Node_1$ and $Node_2$ can then decide their data rate based on the channel conditions between the RN and themselves. If the channel conditions are good enough, $Node_1$ and $Node_2$ may even use a higher data rate than the capacity of the direct link between them. Then $Node_2$ sends out (transmits, communicates) its CTS along with its RD transmission request, which is a request for bidirectional communication. This finishes the handshaking with the RN.

(2) $Node_1$ then transmits $DATA_1$ and a Block ACK request and grants RD transmission to $Node_2$. $Node_2$ sends Block Ack to $Node_1$ ($BA_1$) containing the information regarding any incorrectly received (lost, corrupted, damaged) sub-frames in $DATA_1$, followed by its $DATA_2$ and its Block ACK Request. In another embodiment of the invention, $Node_1$ can grant RD transmission to $Node_2$ without an explicit request from $Node_2$.

(3) The following processing would be similar to the Triple-play protocol without initial handshaking except that $Node_1$ no longer needs to send out the R_RS_TS frame, followed by the RN's C_RS_TS frame.

Figure 4:
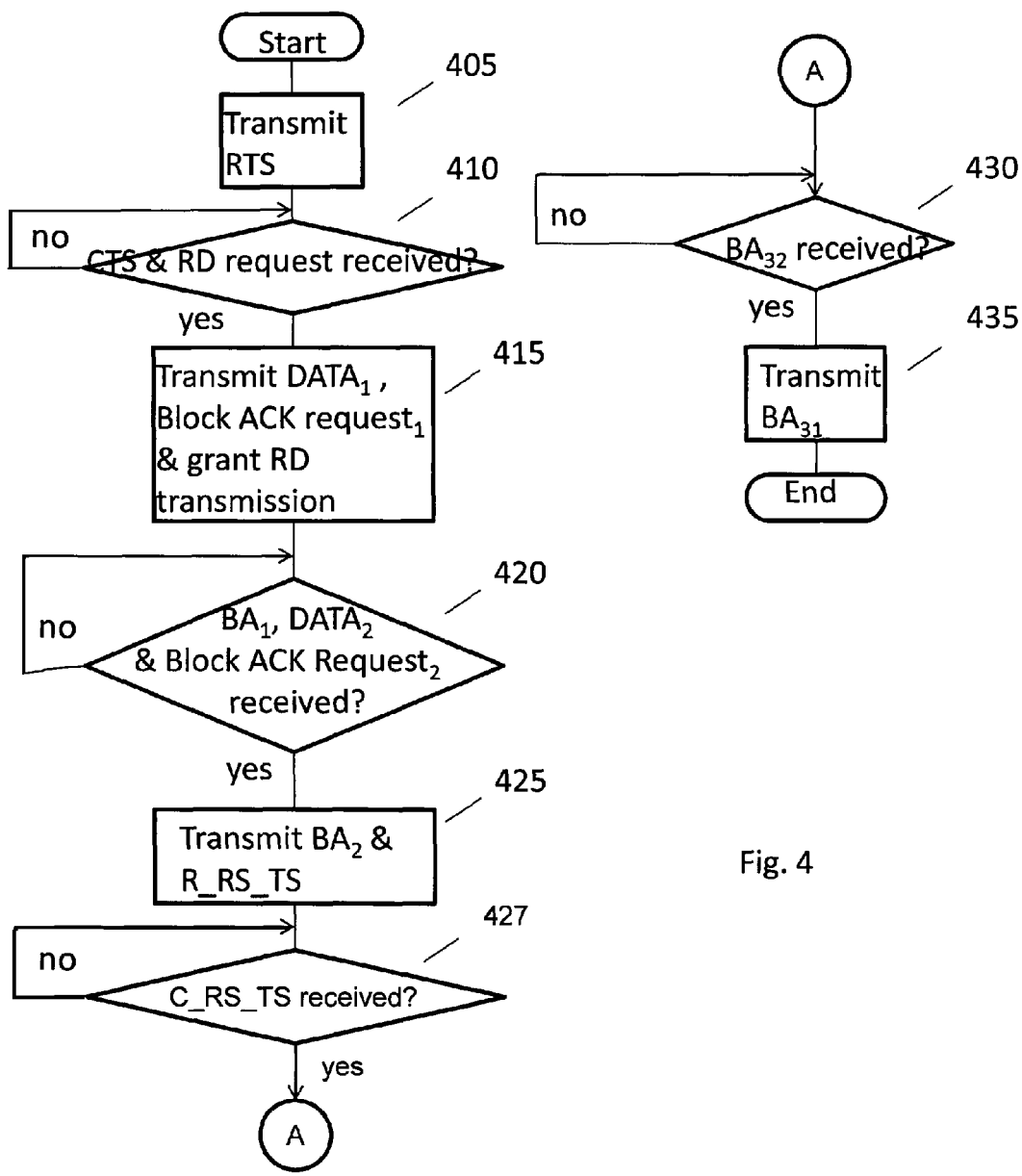
FIG. 4 is a flowchart of the operation of $Node_1$ in accordance with the principles of the first embodiment of the Triple-play protocol of the present invention.

Referring now to FIG. 4, which is a flowchart of the operation of $Node_1$ in accordance with the principles of the first embodiment of the Triple-play protocol of the present invention. At 405 $Node_1$ transmits (communicates, sends out) a RTS signal (message). A test is performed at 410 to determine if $Node_1$ has received a CTS signal (message) and a RD transmission request message (signal) in response to the RTS message (signal) that $Node_1$ transmitted. If $Node_1$ has not received the CTS signal (message) and the RD transmission request message (signal) then processing returns to 410. If $Node_1$ has received the CTS signal (message) and the RD transmission request message (signal) then at 415 $Node_1$ transmits (communicates, sends out) $DATA_1$, Block ACK $request_1$ and RD transmission grant. A test is performed at 420 to determine if $Node_1$ has received $BA_1$, $DATA_2$ and Block ACK $request_2$. If $Node_1$ has not received the $BA_1$, $DATA_2$ and Block ACK $request_2$ signal (message), then processing returns to 420. If $Node_1$ has received the $BA_1$, $DATA_2$ and Block ACK $request_2$ signal (message), then at $Node_1$ transmits (communicates, sends out) $BA_2$ and a R_RS_TS message (signal). A test is performed at 427 to determine if a C_RS_TS signal (message) has been received. If a C_RS_TS signal (message) has been received then a test is performed at 430 to determine if $Node_1$ has received the $BA_{32}$ message (signal). If $Node_1$ has not received the $BA_{32}$ message (signal) then processing returns to 430. If $Node_1$ has received the $BA_{32}$ message (signal), then at 435 $Node_1$ transmits (communicates, sends out) $BA_{31}$. $BA_{31}$ is sent out in response to $DATA_3$, which is received in broadcast (multicast) from the RN. $BA_{32}$ is received from $Node_2$ in response to $DATA_3$, which is received in broadcast (multicast) from the RN. If a C_RS_TS signal (message) has not been received then processing returns to 427. FIG. 4 does not show timers. Timers, however, are used at each point where a test is performed. For example, at 405 a timer is set after the RTS signal (message) is sent (transmitted) and at 410 if no CTS signal (message) is received before the timer expires then $Node_1$ will re-send the RTS signal (message). If the CTS signal (message) is received and no RD signal (message) is received then $Node_1$ proceeds to the next step and assumes that there has been no RD request signal (message) or may assume that the RD request signal (message) was implicit. Similarly at 415, a timer is set after the transmission of $DATA_1$, Block ACK $request_1$ and RD transmission grant. If the timer expires and $BA_1$, $DATA_2$ and Block ACK $request_2$ signals (messages) have not been received then $Node_1$ will re-transmit $BA_1$, $DATA_2$ and Block ACK $request_2$ signals (messages). Alternatively, if the timer expires and $BA_1$, $DATA_2$ and Block ACK $request_2$ signals (messages) have not been received then $Node_1$ will send out a R_RS_TS signal (message) to request help from relay nodes. Similarly, at 427 and 430, timers are set to wait for the reception of the C_RS_TS signal (message) and $BA_{32}$.

Figure 5:
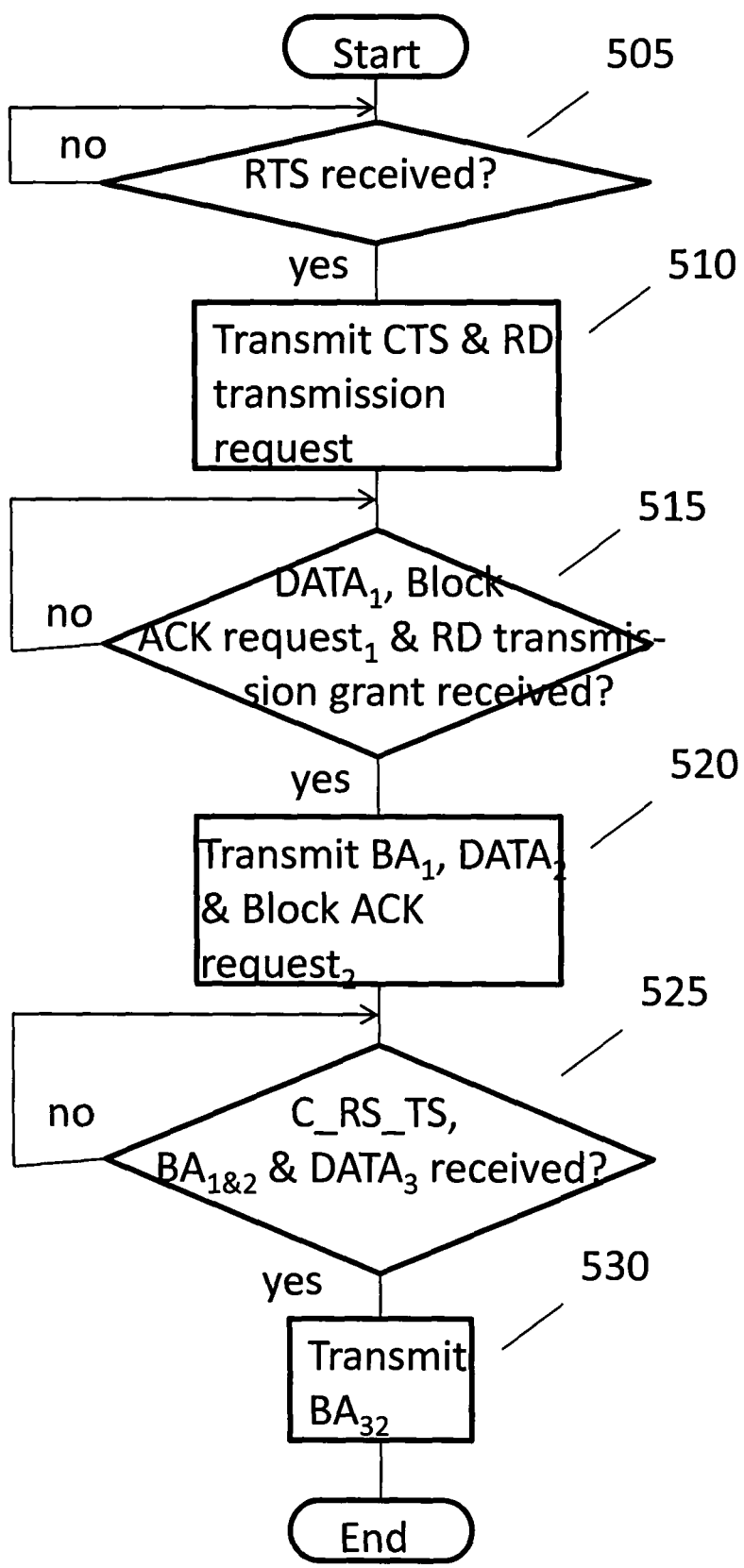
FIG. 5 is a flowchart of the operation of $Node_2$ in accordance with the principles of the first embodiment of the Triple-play protocol of the present invention.

Referring now to FIG. 5, which is a flowchart of the operation of $Node_2$ in accordance with the principles of the first embodiment of the Triple-play protocol of the present invention. A test is performed at 505 to determine if $Node_2$ has received a RTS message (signal) transmitted (communicated, sent out) by $Node_1$. If $Node_2$ has not received the RTS message (signal) sent out (transmitted, communicated) by $Node_1$ then processing returns to 505. If $Node_2$ has received the RTS message signal sent out (transmitted, communicated) by $Node_1$ then at 510, $Node_2$ transmits (communicates, sends out) a CTS message (signal) and a RD transmission request. A test is performed at 515 to determine if $Node_2$ has received $DATA_1$, Block ACK $request_1$ and a RD transmission grant message (signal). If $Node_2$ has not received $DATA_1$, Block ACK $request_1$ and the RD transmission grant message (signal) then processing returns to 515. If $Node_2$ has received $DATA_1$, Block ACK $request_1$ and the RD transmission grant message (signal) then at 520 $Node_2$ transmits (communicates, sends out) $BA_1$, $DATA_2$ and Block ACK $request_2$. A test is performed at 525 to determine if $Node_2$ has received a C_RS_TS message (signal), $BA_{1\&2}$ and $DATA_3$, which were broadcast (multicast) by the RN. If $Node_2$ has not received the C_RS_TS message (signal), $BA_{1\&2}$ and $DATA_3$ then processing returns to 525. If $Node_2$ has received the C_RS_TS message (signal), $BA_{1\&2}$ and $DATA_3$ then at 530 $Node_2$ transmits $BA_{32}$. $BA_{32}$ is received from $Node_2$ in response to $DATA_3$, which is received in broadcast (multicast) from the RN. FIG. 5 does not show timers. Timers, however, are used at most points where a test is performed. For example, at 510 a timer is set after $Node_2$ transmits (communicates, sends out) CTS and RD transmission request and at 515 if $DATA_1$, Block ACK $request_1$ and RD transmission grant signals (messages) have not been received before the timer expires then $Node_2$ re-transmits CTS and RD transmission request signals (messages). Similarly, at 525 a timer is set after $Node_2$ transmits (communicates, sends out) $BA_1$, $Data_2$ and Block ACK $request_2$ signals (messages) and if $Node_2$ has not received C_RS_TS, $BA_{1\&2}$ and $Data_3$ then $Node_2$ re-transmits $BA_1$, $Data_2$ and Block ACK $request_2$ signals (messages).

Figure 6:
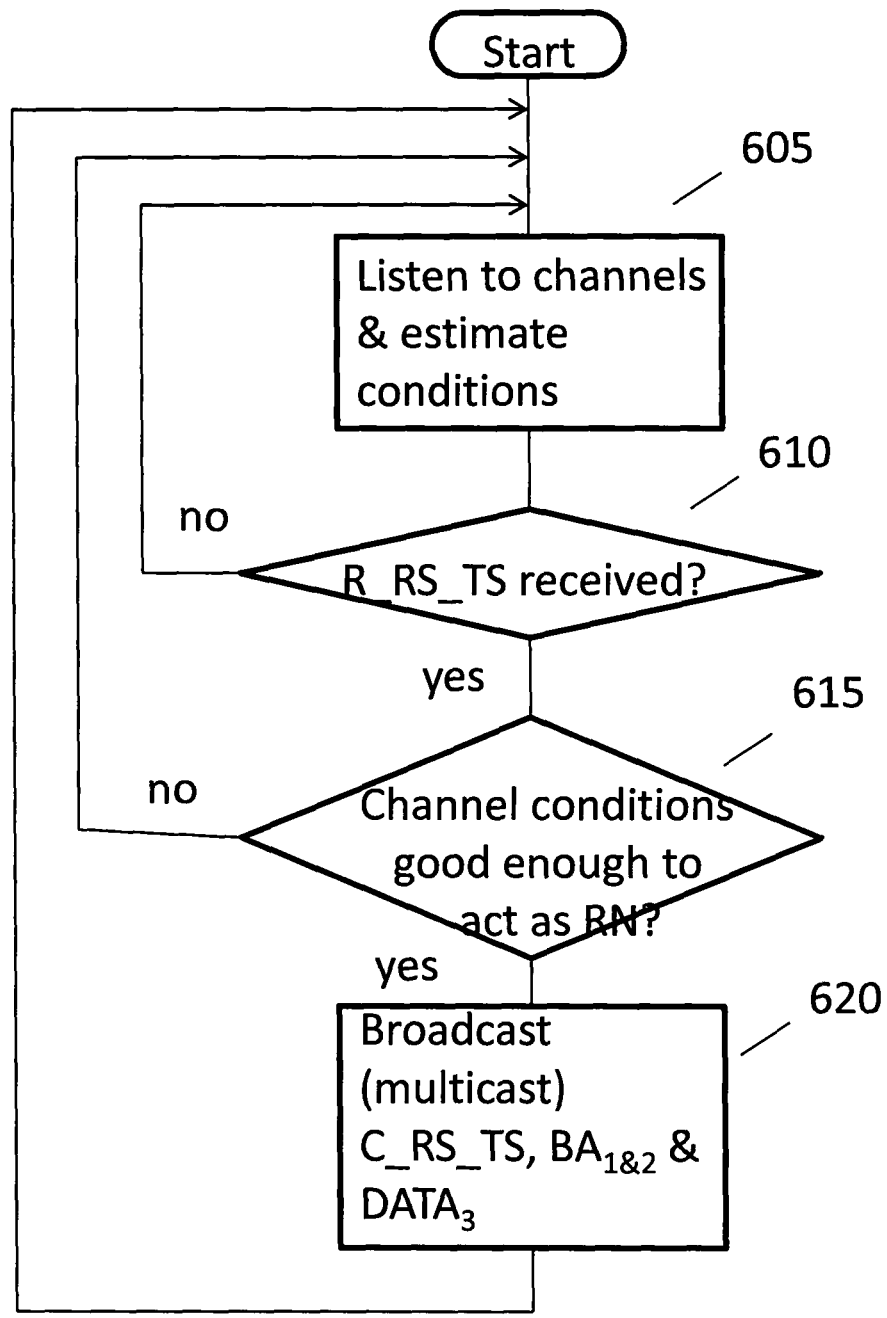
FIG. 6 is a flowchart of the operation of the RN in accordance with the principles of the first embodiment of the Triple-play protocol of the present invention.

Referring now to FIG. 6, which is a flowchart of the operation of the RN in accordance with the principles of the first embodiment of the Triple-play protocol of the present invention. At 605 the RN listens to the channels and estimates the channel conditions. Any of a variety of signal quality measures can be used to indicate channel conditions such as (but not limited to) signal-to-noise ratio (SNR) and received signal strength indication (RSSI). A test is performed at 610 to determine if the RN has received a R_RS_TS message (signal) from $Node_1$. If the RN has not received the R_RS_TS message (signal) then processing returns to 605. If the RN has received the R_RS_TS message (signal) then a test is performed at 615 to determine if the channel conditions are good enough (based on any one or more of the variety of signal quality measures) to act as the RN. If the channel conditions are not good enough (based on any one or more of the variety of signal quality measures) to act as the RN then processing returns to 605. If the channel conditions are good enough (based on any one or more of the variety of signal quality measures) to act as the RN then at 620 the RN broadcasts (multicasts) C_RS_TS, $BA_{1\&2}$ and $DATA_3$. $DATA_3$ as described and discussed above is a mix (combination) of the missing portions of $DATA_1$ and $DATA_2$. The RN creates the mix (combination) based on the information the RN overhears in the block ACKs, $DATA_1$ and $DATA_2$.

Figure 7:
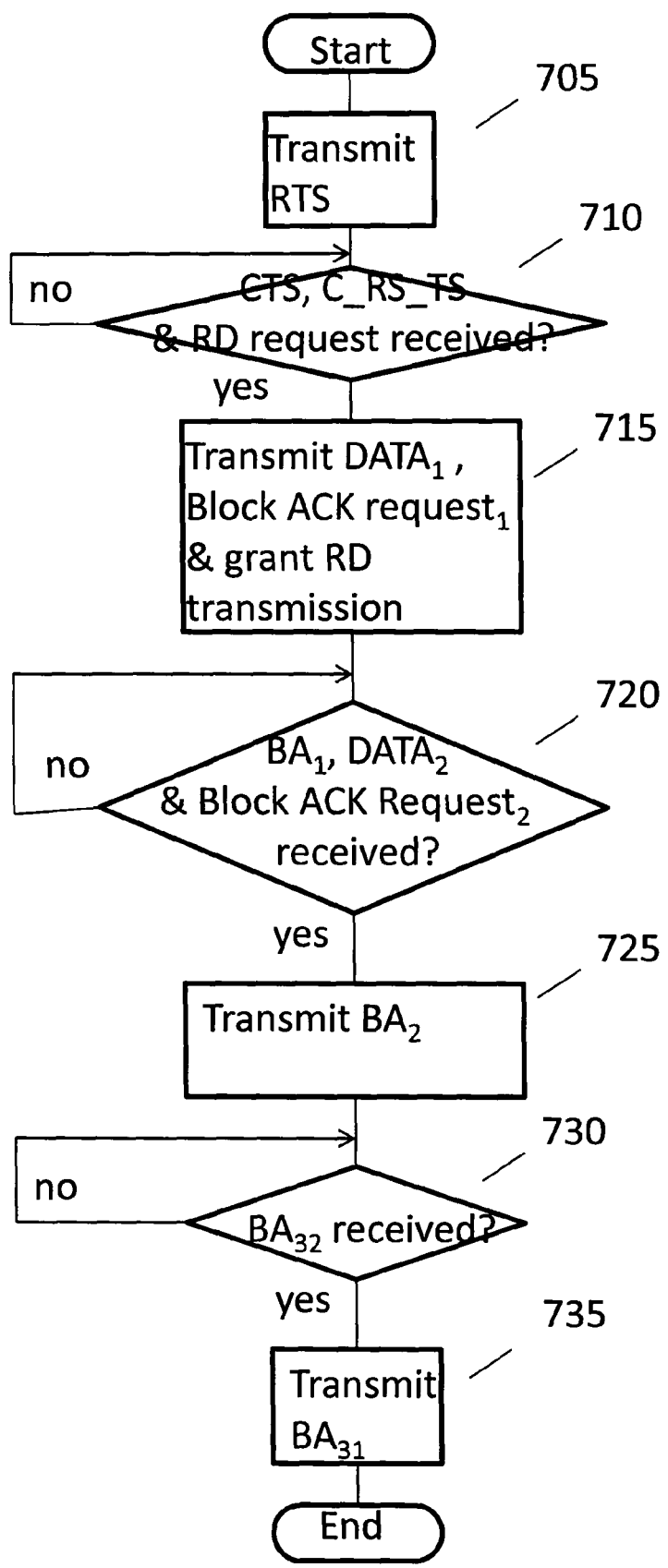
FIG. 7 is a flowchart of the operation of $Node_1$ in accordance with the principles of the second embodiment of the Triple-play protocol of the present invention.

Referring now to FIG. 7, which is a flowchart of the operation of $Node_1$ in accordance with the principles of the second embodiment of the Triple-play protocol of the present invention. At 705 $Node_1$ transmits (communicates, sends out) a RTS signal (message). A test is performed at 710 to determine if $Node_1$ has received a CTS signal (message), a C_RS_TS message (signal) and a RD transmission request message (signal) in response to the RTS message (signal) that $Node_1$ transmitted. If $Node_1$ has not received the CTS signal (message), the C_RS_TS signal (message) and the RD transmission request message (signal) then processing returns to 710. If $Node_1$ has received the CTS signal (message) and the RD transmission request message (signal) then at 715 $Node_1$ transmits (communicates, sends out) $DATA_1$, Block ACK $request_1$ and RD transmission grant. A test is performed at 720 to determine if $Node_1$ has received $BA_1$, $DATA_2$ and Block ACK $request_2$. If $Node_1$ has not received the $BA_1$, $DATA_2$ and Block ACK $request_2$ signal (message), then processing returns to 720. If $Node_1$ has received the $BA_1$, $DATA_2$ and Block ACK $request_2$ signal (message), then at 725 $Node_1$ transmits (communicates, sends out) $BA_2$. A test is performed at 730 to determine if $Node_1$ has received the $BA_{32}$ message (signal). If $Node_1$ has not received the $BA_{32}$ message (signal) then processing returns to 730. If $Node_1$ has received the $BA_{32}$ message (signal), then at 735 $Node_1$ transmits (communicates, sends out) $BA_{31}$. $BA_{31}$ is sent out in response to $DATA_3$, which is received in broadcast (multicast) from the RN. $BA_{32}$ is received from $Node_2$ in response to $DATA_3$, which is received in broadcast (multicast) from the RN. FIG. 7 does not show timers. Timers, however, are used at each point where a test is performed. For example, at 705 a timer is set after the RTS signal (message) is sent (transmitted) and at 710 if no CTS signal (message) and no C_RS_TS signal (message) are received before the timer expires then $Node_1$ will re-send the RTS signal (message). If the CTS signal (message) and C_RS_TS message (signal) are received and no RD signal (message) is received then $Node_1$ proceeds to the next step and assumes that there has been no RD request signal (message) or may assume that the RD request signal (message) was implicit. If the CTS signal (message) is received and no C_RS_TS message (signal) and RD signal (message) is received then $Node_1$ proceeds to the next step and assumes that there has been no relay node and no RD request signal (message) or may assume that the RD request signal (message) was implicit. Similarly at 715, a timer is set after the transmission of $DATA_1$, Block ACK $request_1$ and RD transmission grant. If the timer expires and $BA_1$, $DATA_2$ and Block ACK $request_2$ signal (message) have not been received then $Node_1$ will re-transmit $BA_1$, $DATA_2$ and Block ACK $request_2$ signals (messages). Similarly, at 730, a timer is set to wait for the reception of $BA_{32}$.

Figure 8:
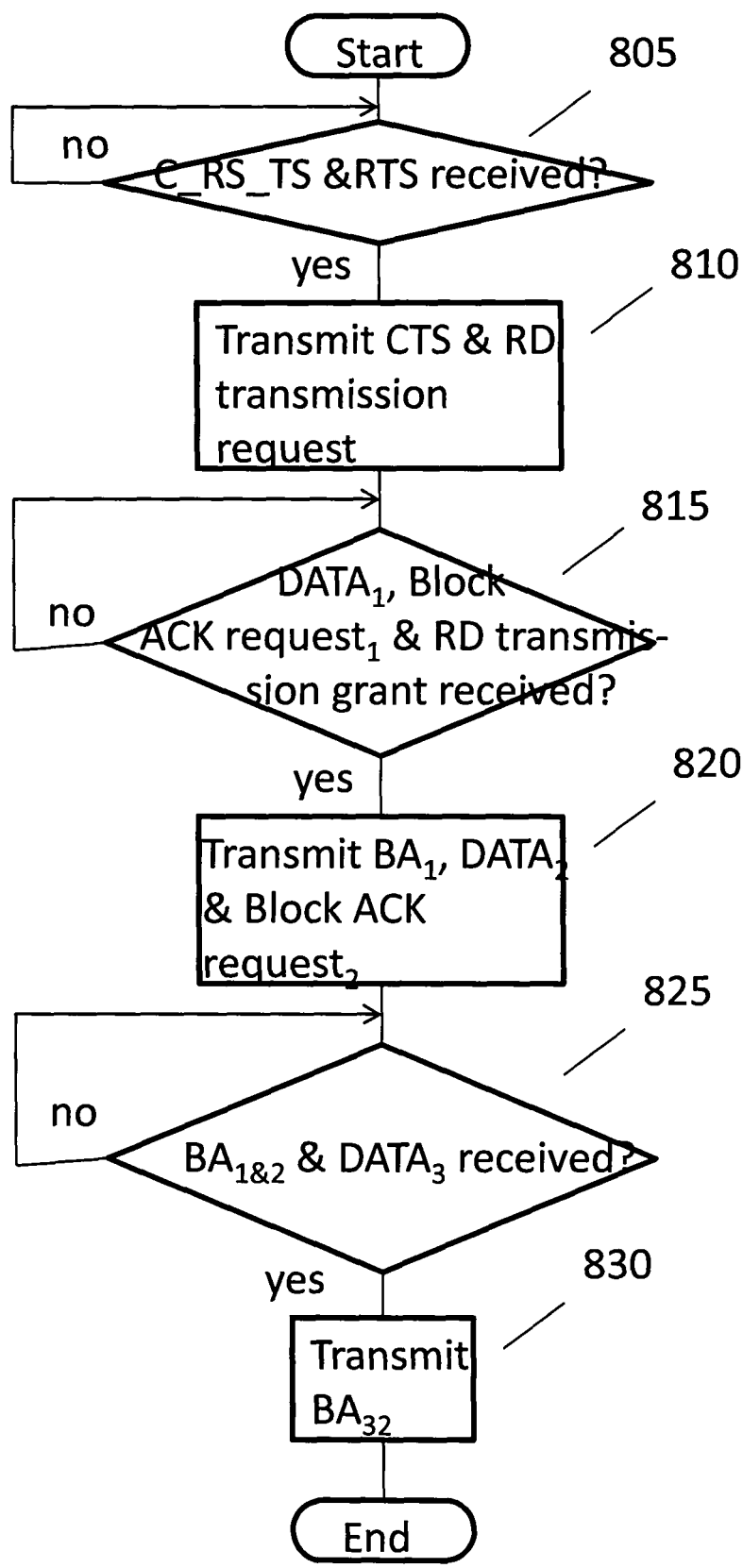
FIG. 8 is a flowchart of the operation of $Node_2$ in accordance with the principles of the second embodiment of the Triple-play protocol of the present invention.

Referring now to FIG. 8, which is a flowchart of the operation of $Node_2$ in accordance with the principles of the second embodiment of the Triple-play protocol of the present invention. A test is performed at 805 to determine if $Node_2$ has received a RTS message (signal) transmitted (communicated, sent out) by $Node_1$ and a C_RS_TS message (signal) broadcast (multicast) by the RN. If Node$_2$ has not received the RTS message (signal) sent out (transmitted, communicated) by Node$_1$ and the C_RS_TS message (signal) broadcast (multicast) by the RN then processing returns to 805. If Node$_2$ has received the RTS message signal sent out (transmitted, communicated) by Node$_1$ and the C_RS_TS message (signal) broadcast (multicast) by the RN then at 810, Node$_2$ transmits (communicates, sends out) a CTS message (signal) and a RD transmission request. A test is performed at 815 to determine if Node$_2$ has received DATA$_1$, Block ACK request$_1$ and a RD transmission grant message (signal). If Node$_2$ has not received DATA$_1$, Block ACK request$_1$ and the RD transmission grant message (signal), then processing returns to 815. If Node$_2$ has received DATA$_1$, Block ACK request$_1$ and the RD transmission grant message (signal) then at 820 Node$_2$ transmits (communicates, sends out) BA$_1$, DATA$_2$ and Block ACK request$_2$. A test is performed at 825 to determine if Node$_2$ has received BA$_{1\&2}$ and DATA$_3$, which were broadcast (multicast) by the RN. If Node$_2$ has not received BA$_{1\&2}$ and DATA$_3$ then processing returns to 825. If Node$_2$ has received the C_RS_TS message (signal), BA$_{1\&2}$ and DATA$_3$ then at 830 Node$_2$ transmits BA$_{32}$. BA$_{32}$ is transmitted (communicated, sent out) by Node$_2$ in response to DATA$_3$, which is received in broadcast (multicast) from the RN. FIG. 8 does not show timers. Timers, however, are used at most points where a test is performed. For example, at 810 a timer is set after Node$_2$ transmits (communicates, sends out) CTS and RD transmission request and at 815 if DATA$_1$, Block ACK request$_1$ and RD transmission grant signals (messages) have not been received before the timer expires then Node$_2$ re-transmits CTS and RD transmission request signals (messages). Similarly, at 825 a timer is set after Node$_2$ transmits (communicates, sends out) BA$_1$, Data$_2$ and Block ACK request$_2$ signals (messages) and if Node$_2$ has not received BA$_{1\&2}$ and Data$_3$ then Node$_2$ re-transmits BA$_1$, Data$_2$ and Block ACK request$_2$ signals (messages).

Figure 9:
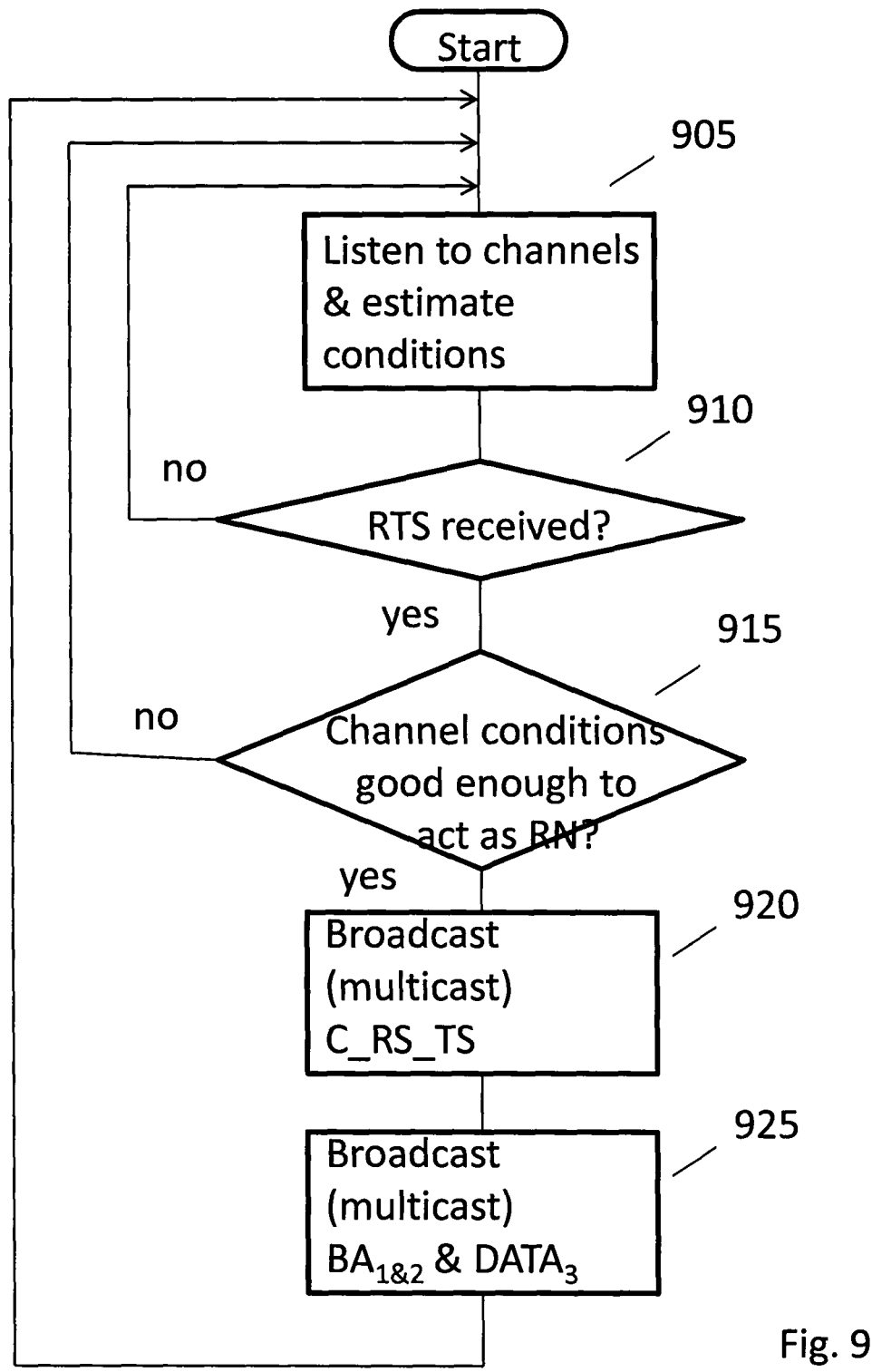
FIG. 9 is a flowchart of the operation of the RN in accordance with the principles of the second embodiment of the Triple-play protocol of the present invention.

Referring now to FIG. 9, which is a flowchart of the operation of the RN in accordance with the principles of the second embodiment of the Triple-play protocol of the present invention. At 905 the RN listens to the channels and estimates the channel conditions. Any of a variety of signal quality measures can be used to indicate channel conditions such as (but not limited to) signal-to-noise ratio (SNR) and received signal strength indication (RSSI). A test is performed at 910 to determine if the RN has received (overheard) a RTS message (signal) from Node$_1$. If the RN has not received (overheard) the RTS message (signal) then processing returns to 905. If the RN has received (overheard) the RTS message (signal) then a test is performed at 915 to determine if the channel conditions are good enough (based on any one or more of the variety of signal quality measures) to act as the RN. If the channel conditions are not good enough (based on any one or more of the variety of signal quality measures) to act as the RN then processing returns to 905. If the channel conditions are good enough (based on any one or more of the variety of signal quality measures) to act as the RN then at 920 the RN broadcasts (multicasts) C_RS_TS AT 925 the RN broadcasts (multicasts) BA$_{1\&2}$ and DATA$_3$. DATA$_3$ as described and discussed above is a mix (combination) of the missing portions of DATA$_1$ and DATA$_2$. The RN creates the mix (combination) based on the information the RN overhears in the block ACKs, DATA$_1$ and DATA$_2$.

Figure 10:
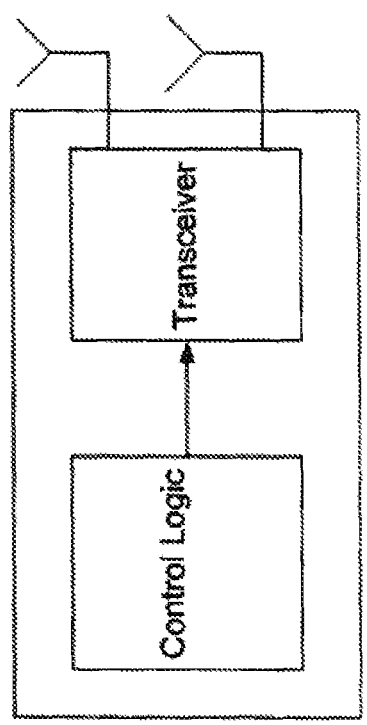
FIG. 10 is a block diagram of an exemplary apparatus in accordance with the principles of the present invention.

FIG. 10 is a block diagram of an exemplary apparatus in accordance with the principles of the present invention. Since any node can behave at various times as a source node, a destination node and a relay node, the apparatus of FIG. 10 is at various times each of these devices (apparatuses). The transceiver actually transmits and receives data and any control signals and the control logic performs all other functions.

Specifically, when behaving as a source node, the control logic portion of the apparatus of FIG. 10 includes means for determining if a clear-to-send signal and a reverse direction transmission request signal have been received, means for determining if a first block acknowledgement signal, second data and a second block acknowledgement request signal have been received and means for determining if a third block acknowledgement signal has been received. In the second embodiment of the present invention (behaving as a source node) the first means for determining further comprises means for determining if a relay node clear to send signal has been received. The transceiver portion of the apparatus of FIG. 10 behaving as a source node includes means for transmitting a request-to-send signal, means for transmitting first data, a first block acknowledgement request signal and a reverse direction grant signal responsive to the first means for determining, means for transmitting a second block acknowledgement signal responsive to the second means for determining and means for transmitting a fourth block acknowledgement signal responsive to said third means for determining. The first embodiment of the invention (behaving as a source node) further comprises means for transmitting a relay node request to send signal responsive to the second means for determining.

Specifically, when behaving as a destination node, the control logic portion of the apparatus of FIG. 10 includes means for determining if a request to send signal has been received, means for determining if first data, a first block acknowledgement request signal and a reverse direction transmission grant signal have been received, and means for determining if a second block acknowledgement signal and third data have been received. In the first embodiment of the invention (behaving as a destination node) in the control logic, the third means for determining further comprises means for determining if a relay node clear to send signal has been received. In the second embodiment of the invention (behaving as a destination node) in the control logic, the first means for determining further comprises means for determining if a relay node clear to send signal has been received. The transceiver portion of the apparatus of FIG. 10 (behaving as a destination node) includes means for transmitting a clear to send signal, a reverse direction transmission request signal responsive to the first means for determining, means for transmitting first block acknowledgement signal, second data and a second block acknowledgement request responsive to the second means for determining and means for transmitting a third block acknowledgement signal responsive to the third means for determining.

Specifically, when behaving as a relay node, the control logic portion of the apparatus of FIG. 10 includes means for listening to channels, means for estimating channel conditions responsive to the means for listening, means for receiving first data from a first node, means for receiving second data from a second node, means for determining if a signal has been received, means for determining if channel conditions are adequate to act as a relay node. In the first embodiment of the present invention (behaving as a relay node) the signal is a relay node request to send signal. In the second embodiment of the present invention (behaving as a relay node) the signal is a request to send signal. The transceiver portion of the apparatus of FIG. 10 (behaving as a relay node) includes means for multicasting a relay node clear to send signal responsive to said first and second means for determining and means for multicasting a block acknowledgement signal and third data responsive to the first and second means for determining.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for transmitting first data from a first node to a second node and transmitting second data from said second node to said first node via a relay node, said method comprising, at the first node:
   first transmitting, by the first node, a request-to-send signal;
   first determining, by the first node, if a clear-to-send signal and a reverse direction transmission request signal have been received;
   second transmitting, by the first node, first data, a first block acknowledgement request signal and a reverse direction grant signal responsive to said first determination;
   second determining, by the first node, if a first block acknowledgement signal, said second data and a second block acknowledgement request signal have been received;
   third transmitting, by the first node, at least one of transmitting a relay node request to send signal to the relay node and a second block acknowledgement signal responsive to said second determination;
   third determining, by the first node, if a third block acknowledgement signal has been received and wherein said first determination further comprises determining if a relay node clear to send signal has been received; and
   fourth transmitting, by the first node, a fourth block acknowledgement signal responsive to said third determination.

2. An apparatus for transmitting first data from a first node to a second node and transmitting second data from said second node to said first node via a relay node, said apparatus comprising a first node including a control logic and a transceiver, wherein
   said transceiver transmits a request-to-send signal;
   said control logic determines during a first determination if a clear-to-send signal and a reverse direction transmission request signal have been received;
   said transceiver transmits first data, a first block acknowledgement request signal and a reverse direction grant signal responsive to said first determination;
   said control logic determines during a second determination if a first block acknowledgement signal, second data and a second block acknowledgement request signal have been received;
   said transceiver transmits at least one of a relay node request to send signal and a second block acknowledgement signal responsive to said second determination;
   said control logic determines during a third determination if a third block acknowledgement signal has been received and wherein said control logic further determines if a relay node clear to send signal has been received; and
   said transceiver transmits a fourth block acknowledgement signal responsive to said third determination.

3. A method for transmitting first data from a first node to a second node and transmitting second data from said second node to said first node via a relay node, said method comprising a first node including a control logic and a transceiver, wherein, said method comprising, at the second node:
   first determining, by the second node, if a request to send signal has been received;
   first transmitting, by the second node, a clear to send signal and a reverse direction transmission request signal responsive to said first determination;
   second determining, by the second node, if said first data, a first block acknowledgement request signal and a reverse direction transmission grant signal have been received;
   second transmitting, by the second node, first block acknowledgement signal, said second data and a second block acknowledgement request responsive to said second determination;
   third determining, by the second node, if a second block acknowledgement signal and third data have been received, wherein one of said first determination and said third determination further comprises determining if a relay node clear to send signal has been received; and
   third transmitting, by the second node, a third block acknowledgement signal responsive to said third determination.

4. An apparatus for transmitting first data from a first node to a second node and transmitting second data from said second node to said first node via a relay node, said apparatus comprising a first node including a control logic and a transceiver, wherein
   said control logic determines during a first determination if a request to send signal has been received;
   said transceiver transmits a clear to send signal and a reverse direction transmission request signal responsive to said first determination;
   said control logic determines during a second determination if first data, a first block acknowledgement request signal and a reverse direction transmission grant signal have been received;
   said transceiver transmits a first block acknowledgement signal, said second data and a second block acknowledgement request responsive to said second determination;
   said control logic determines during a third determination if a second block acknowledgement signal and third data have been received, wherein one of said first determination and said third determination further comprises said control logic determining if a relay node clear to send signal has been received; and said transceiver transmits a third block acknowledgement signal responsive to said third determination.

5. A method for transmitting first data from a first node to a second node and transmitting second data from said second node to said first node via a relay node, said method comprising, at the relay node:
- listening, by the relay node, to channels;
- first receiving, by the relay node, the first data from the first node;
- second receiving, by the relay node, said second data from the second node;
- first determining if the relay node overhears at least one of a first block acknowledgement from the first node and a second block acknowledgement from said second node;
- second determining, by the relay node, if a signal has been received wherein said signal is one of a relay node request to send signal and a request to send signal;
- third determining if channel conditions are adequate to act as the relay node responsive to said listening;
- multicasting a relay node clear to send signal responsive to said first and second determinations; and
- multicasting a block acknowledgement signal and third data responsive to said first and second determinations, wherein said third data is a combination of corrupted portions of said first data and corrupted portions of said second data.

6. An apparatus for transmitting first data from a first node to a second node and transmitting second data from said second node to said first node via a relay node, said apparatus comprising a relay node including a control logic and a transceiver, wherein:
- said control logic listens to channels;
- said transceiver receives first data from a first node;
- said transceiver receives second data from a second node;
- said control logic determines during a first determination if the relay node overhears at least one of a first block acknowledgement from the first node and a second block acknowledgement from the second node;
- said control logic determines during a second determination if a signal has been received, wherein said signal is one of a relay request to send signal and a request to send signal;
- said control logic determines if channel conditions are adequate to act as a relay node responsive to said listening;
- said transceiver multicasts a relay node clear to send signal responsive to said first determination and said second determination; and
- said transceiver multicasts a block acknowledgement signal and a third data responsive to said first determination and said second determination, wherein said third data is a combination of corrupted portions of said first data and corrupted portions of said second data.

* * * * *